United States Patent
Chang

(10) Patent No.: US 9,028,068 B2
(45) Date of Patent: May 12, 2015

(54) ELECTRONIC EYEGLASSES

(71) Applicant: Hon Hai Precision Industry Co., Ltd., New Taipei (TW)

(72) Inventor: Jen-Tsorng Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 55 days.

(21) Appl. No.: 13/928,740

(22) Filed: Jun. 27, 2013

(65) Prior Publication Data

US 2014/0118680 A1    May 1, 2014

(30) Foreign Application Priority Data

Oct. 26, 2012    (CN) .......................... 2012 1 0415376

(51) Int. Cl.
*A61B 3/113*    (2006.01)
*G02C 11/00*    (2006.01)

(52) U.S. Cl.
CPC ................ *G02C 11/00* (2013.01); *G02C 11/10* (2013.01)

(58) Field of Classification Search
USPC ............ 351/209, 210, 205, 158, 41; 345/7, 8; 340/575, 573.1, 576
See application file for complete search history.

(56) References Cited

U.S. PATENT DOCUMENTS

| RE41,376 E * | 6/2010 | Torch ............................. 340/575 |
| 2012/0133892 A1 * | 5/2012 | Furman et al. ................. 351/210 |
| 2013/0176533 A1 * | 7/2013 | Raffle et al. .................... 351/209 |

* cited by examiner

*Primary Examiner* — Hung Dang
(74) *Attorney, Agent, or Firm* — Novak Druce Connolly Bove + Quigg LLP

(57) ABSTRACT

An electronic eyeglasses includes a camera module and a controller. The camera module captures consecutive images of eyes wearing the electronic eyeglasses. The controller includes a recognition module, a storage module, and a control module. The recognition module recognizes movement of the eyes by processing the consecutive images. The storage module stores an index table having a collection of eye movements and a collection of commands each of which is associated with one of the eye movements. The control module indexes a command from the index table using the movement of the eyes and controls the electronic eyeglasses to execute the command.

12 Claims, 3 Drawing Sheets

ELECTRONIC EYEGLASSES

BACKGROUND

1. Technical Field

The present disclosure relates to eyeglasses and, particularly, to an electronic eyeglass.

2. Description of Related Art

Electronic eyeglasses are eyeglasses integrated with micro-projectors, camera modules, touch panels, microphones, speakers, and various sensors to capture and display information. Currently, electronic eyeglasses can be operated by voice control. However, it may be problematic for users who have difficulty speaking or inappropriate when operating in some locations such as libraries or classrooms.

Therefore, it is desirable to provide electronic eyeglasses, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
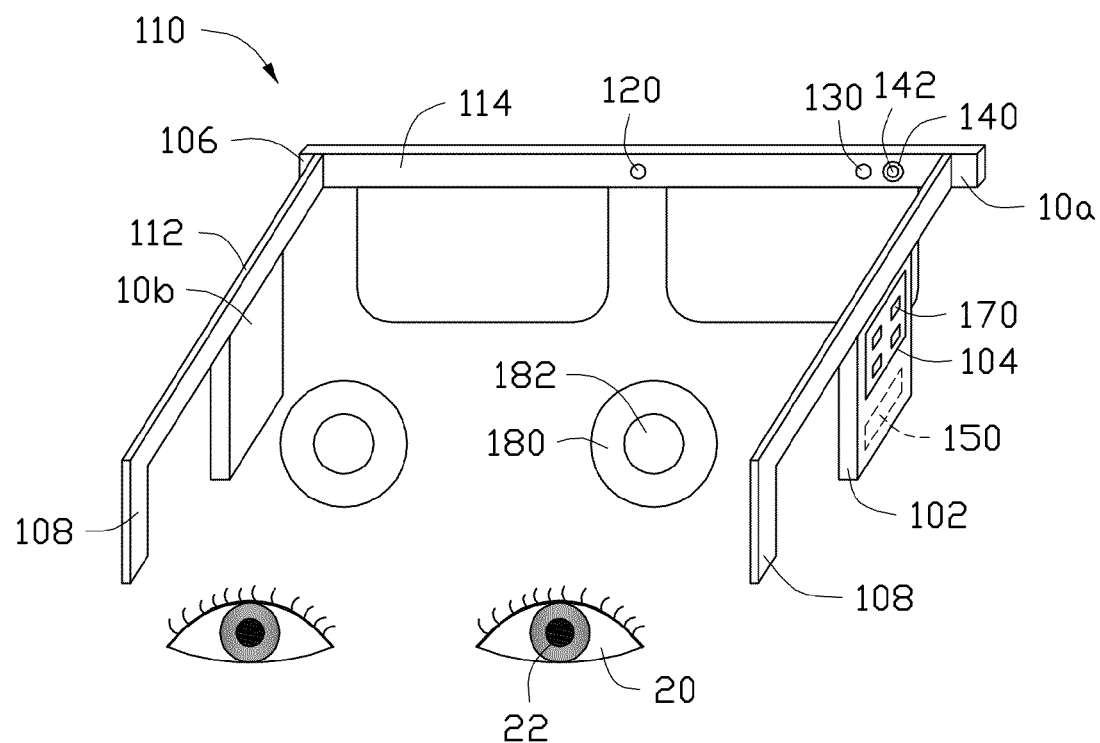
FIG. 1 is an isometric schematic view of an embodiment of electronic eyeglasses.
Figure 2:
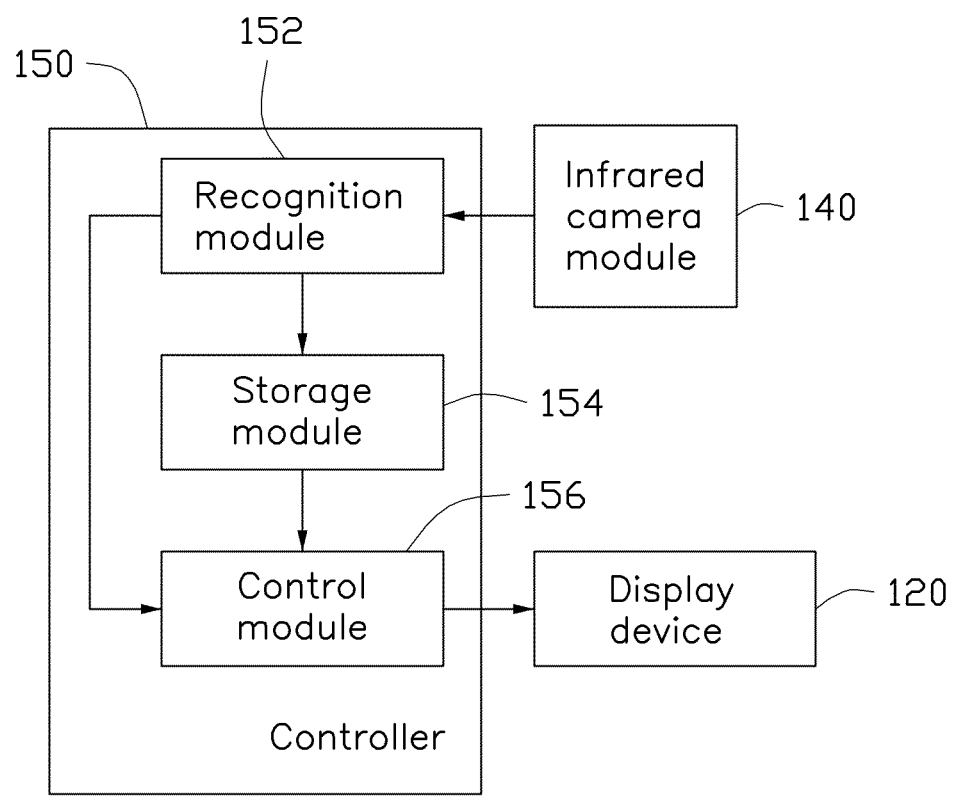
FIG. 2 is a functional block diagram of the electronic eyeglasses of FIG. 1.

Referring to FIGS. 1-2, an embodiment of electronic eyeglasses 10 includes a frame 110, a display device 120, an infrared light source 130, an infrared camera module 140, and a controller 150.

The frame 110 includes a main body 114 and a pair of legs 112 extend from opposite ends of the main body 114. The legs 112 can be made of aluminum and are integrated with control circuits 102, a control panel 104, a microphone 106, a speaker 108, various sensors 10a, and a battery 10b, which can be connected with each other. The control circuits 102 are configured for controlling and coordinating the electronic eyeglasses 10. The control panel 104 is configured for receiving user touches. The microphone 106 is configured for receiving voice inputs. The speaker 108 is configured for outputting sound. The various sensors 10a can be gyroscopes, global positioning system sensors, and so on. The battery 10b is configured for supplying electric power for the electronic eyeglass 20.

Figure 3:
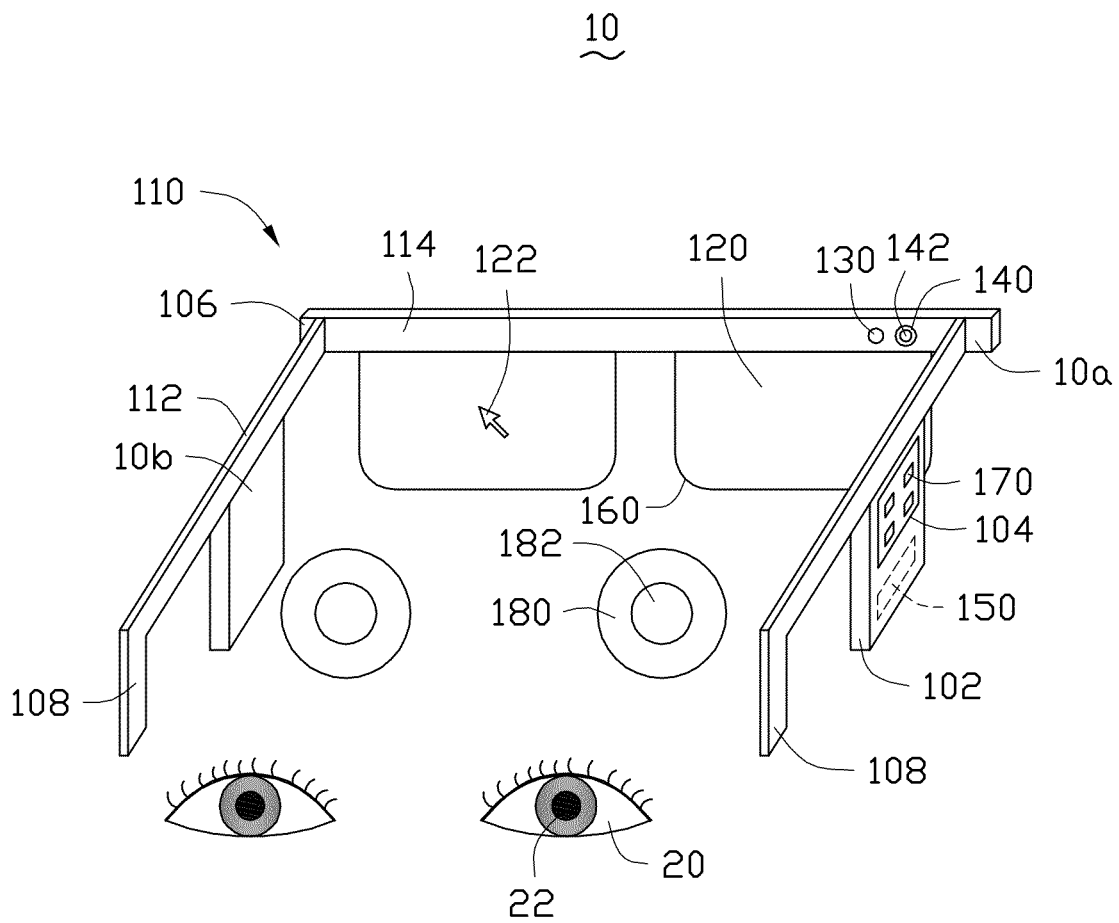
FIG. 3 is an isometric schematic view of another embodiment of electronic eyeglasses.

The display device 120 is configured for displaying information for eyes 20 wearing the electronic eyeglasses 10. In this embodiment, the display device 120 is a micro laser projector directly projecting the information onto the eyes 20. However, referring to FIG. 3, in another embodiment, the electronic eyeglasses 10 includes a pair of glasses 160 framed by the main body 114. The display device 120 is a transmissive-type liquid crystal display formed on the glasses 160.

The infrared light source 130, such as an infrared light emitting diode, is configured for emitting infrared light to the eyes 20.

The infrared camera module 140, such as a common camera module having an infrared band-pass filter 142, is configured for capturing consecutive infrared images of the eyes 20.

By employing the infrared light source 130 and the infrared camera module 140, the eyes 20 can be clearly imaged even in dark. In addition, the infrared light does not interfere viewing of the display device 120. However, in other embodiments, the infrared camera module 140 can be replaced with a common camera module to capture consecutive images of the eyes 20 and the infrared light source 130 can be omitted.

The display device 120, the infrared light source 130, and the infrared camera module 140 are positioned on the main body 114 and aimed at the eyes 20.

The controller 150 can also be integrated on the legs 112 and includes a recognition module 152, a storage module 154, and a control module 156.

The recognition module 152 is connected to the infrared camera module 140 and configured for processing the consecutive infrared images, recognizing the pupils 22 of the eyes 20, and thus recognizing movement of the eyes 20.

The storage module 154 stores an index table having a collection of eye movements and a collection of commands each of which is associated with one of the eye movements. The control module 156 is connected to the recognition module 152, the storage module 154, and the display device 120, and is configured for indexing a command from the index table using the movement of the eyes 20 and the index table and controlling the display device 120 based upon the command. In detail, the control module 156 compares the movement of the eyes 20 with each of the eye movements in the index table and finds the command associated with one of the eye movements that is substantially identical to the movement of the eyes 20.

In this manner, as an example, the control module 156 can interpret a trajectory of the pupils 22 (i.e., the movement of the eyes 20) as a trajectory of a cursor 122 (see FIG. 3) on the display device 120 (i.e., the command to control the cursor 122 to move along the trajectory), which is identical to the trajectory of the pupils 22, and the control module 156 can also interpret winking of the eyes (i.e., the movement of the eyes 20) as clicking of the cursor 122 (i.e., the command to control the cursor 122 to click)

In other embodiments, the commands can be used to control the electronic eyeglasses 10 in addition to controlling the display device 120.

As such, the electronic eyeglasses 20 can be operated by eye movements.

The electronic eyeglasses 10 can further includes a switch 170 configured for activating or inactivating control of the eye movement. The switch 170 can be a button on the control panel 104.

The electronic eyeglasses 10 can further includes a pair of contact lenses 180. Each contact lens 180 includes a central infrared reflective region 182 to increase reflectivity of the infrared light when the contact lenses 180 are worn by a viewer.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An electronic eyeglasses, comprising:
a camera module for capturing consecutive images of eyes of a user wearing the electronic eyeglasses; and
a controller connected to the camera module, the controller comprising:
a recognition module to recognize movement of the eyes by processing the consecutive images;
a storage module storing an index table having a collection of eye movements and a collection of commands each of which is associated with one of the eye movements; and
a control module to index a command from the index table using the movement of the eyes and control the electronic eyeglasses to execute the command.

2. The electronic eyeglasses of claim 1, further comprising a frame, the frame comprising a main body and two legs extending from opposite ends of the main body, the camera module being positioned on the main body and aimed at the eyes.

3. The electronic eyeglasses of claim 2, wherein the legs are made of aluminum and integrated with control circuits, a control panel, a microphone, a speaker, various sensors, and a battery, which are connected with each other, the control circuits are configured for controlling and coordinating the electronic eyeglasses, the control panel is configured for receiving user touches, the microphone is configured for receiving voice inputs, the speaker is configured for outputting sound, the various sensors comprises gyroscopes and global positioning system sensors, and the battery is configured for supplying electric power for the electronic eyeglasses.

4. The electronic eyeglasses of claim 1, wherein the camera module comprises an infrared band-pass filter, and the electronic eyeglasses further comprises an infrared light source to emit light to the eyes.

5. The electronic eyeglasses of claim 4, wherein the infrared light source is an infrared light emitting diode.

6. The electronic eyeglasses of claim 4, further comprising a pair of contact lenses, each of the contact lenses comprising a central infrared reflective region.

7. The electronic eyeglasses of claim 1, further comprising a display device for displaying information to the eyes, the command being executed to control the display device.

8. The electronic eyeglasses of claim 7, wherein the movement of the eyes is a trajectory of pupils of the eyes and the command is moving a cursor on the display along the trajectory of the pupils.

9. The electronic eyeglasses of claim 7, wherein the movement of the eyes is winking and the command is clicking a cursor on the display.

10. The electronic eyeglasses of claim 7, wherein the display device is a micro-projector projecting information directly to the eyes.

11. The electronic eyeglasses of claim 7, further comprising a pair of glasses, the display device being a transmissive-type liquid crystal display formed on the glasses.

12. The electronic eyeglasses of claim 1, further comprising a switch configured for activating or inactivating control of the eye movement.

* * * * *